ated May 1, 1956

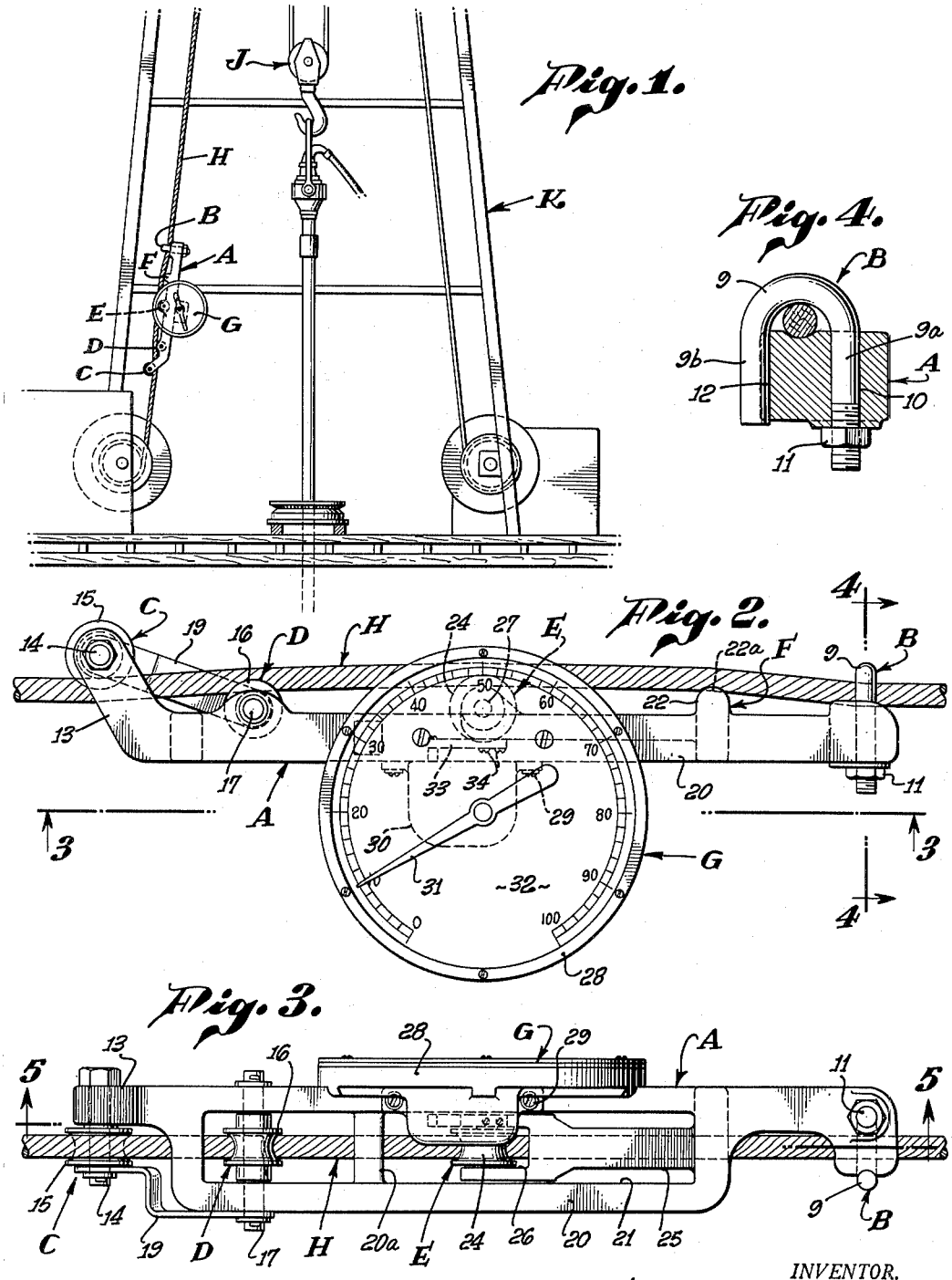

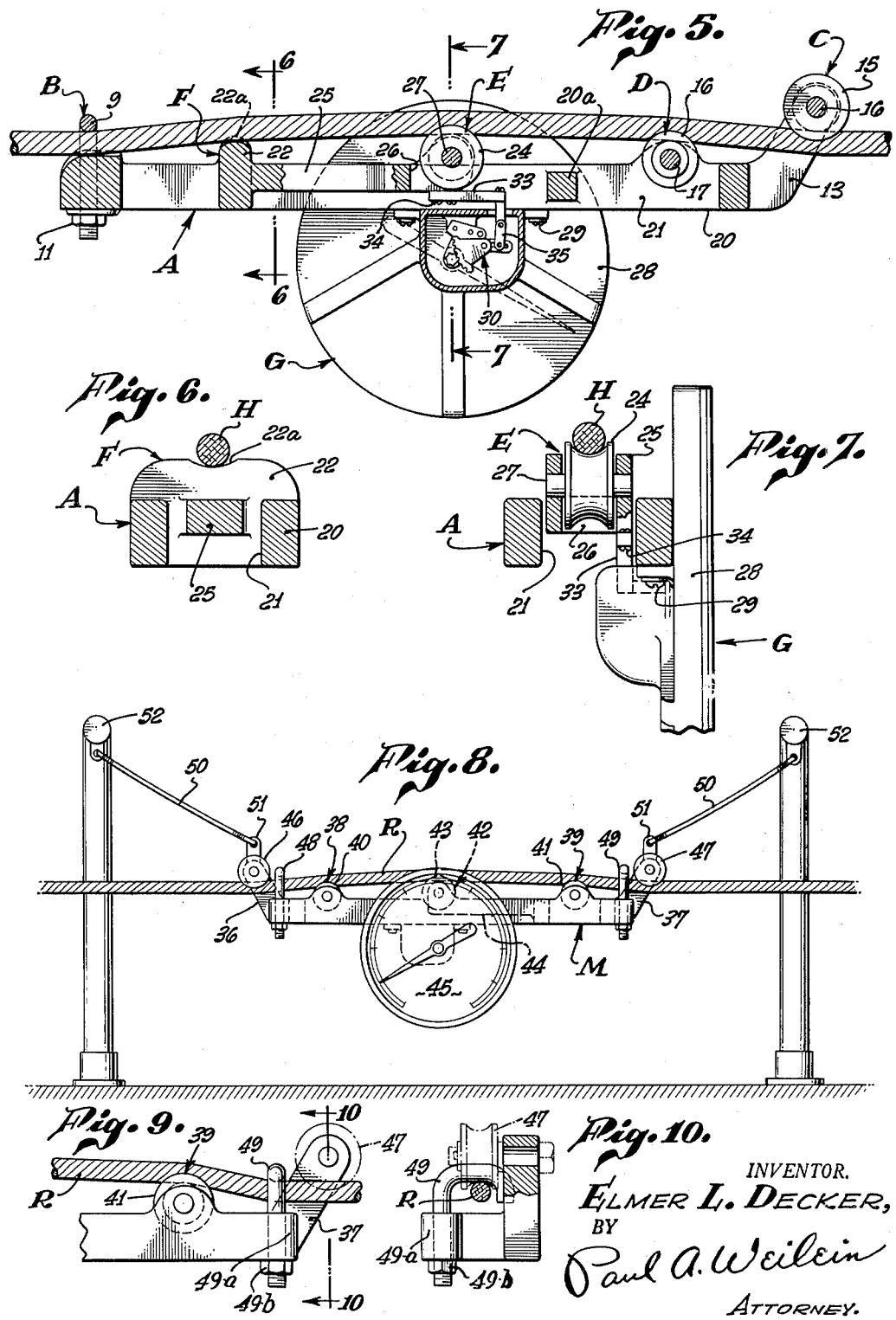

2,743,607

CABLE TENSION INDICATOR

Elmer L. Decker, Long Beach, Calif., assignor to Martin-Decker Corporation, Long Beach, Calif., a corporation of Delaware Application August 17, 1951, Serial No. 242,273

10 Claims. (Cl. 73—144)

This invention relates to apparatus for determining the tension on cables or similar lines employed for hoisting, towing or other load-sustaining purposes.

It is an object of this invention to provide an improved apparatus of this character.

It is another object of this invention to provide a tension indicating device which without change in construction, adjustment or substitution of parts, is applicable to cables or lines of different diameters for accurately determining the tension thereon.

It is a further object of this invention to provide cable tension indicating means for determining the tension on a running line.

It is another object of this invention to provide an indicator such as described which is subject to being readily and easily set up for indicating the load sustained by a running line or a stationary line.

It is another object to provide a cable tension indicating device wherein a body structure, means forming surfaces for engaging one side of the cable, and means forming a movable cable-contacting surface in yieldable contact with said one side of the cable are constructed and arranged in a manner to provide a compact, strong and rugged gauge-operating instrument having the advantages herein noted.

It is another object of the present invention to provide in an indicator such as described, a novel means which facilitates the application of the indicator to heavily loaded cables or lines of different diameters.

This invention possesses many other advantages and has other objects which may be made more easily apparent from a consideration of several embodiments of the invention. For this purpose there are shown two forms in the drawing accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 1 is a fragmentary elevational view showing a device embodying the present invention as applied for determining the tension on the dead line of hoisting mechanism for a well;

Fig. 2 is a side elevation of the indicator on an enlarged scale;

Fig. 3 is a plan view looking in the direction of the arrow 3—3 of Fig. 2;

Fig. 4 is a sectional view taken on the line 4—4 of Fig. 2;

Fig. 5 is a longitudinal sectional view taken on the line 5—5 of Fig. 3;

Fig. 6 is a sectional view taken on the line 6—6 of Fig 5;

Fig. 7 is a sectional view taken on line 7—7 of Fig. 5;

Fig. 8 is a side elevation of a modified form of this invention;

Fig. 9 is an enlarged fragmentary elevational view showing how the modified form of Fig. 8 is installed on the running line; and Fig. 10 is a sectional view taken on line 10—10 of Fig. 9.

The present invention includes a body member A provided with means B and C for supporting it adjacent a load sustaining cable or line, whereby means D, E and F forming line-contacting surfaces spaced one from the other and from the means B and C, will contact the same side of the line.

The body member A and the means E are relatively movable, and the line contacting surface formed by the means E is outwardly offset from the line contacting surfaces formed by the means D and F, whereby the line will be deflected relative to the portions of the line in contact with the surfaces formed by the means D and F. Thus, according to loads imposed on the line, the deflected portion thereof will tend to straighten out and cause such relative movement between the means E and the body member A as will be effective for operating a gauge G to indicate the tension on the line.

As shown in Figs. 1 through 7, one embodiment of this invention is adapted for application to a stationary cable or line, for example, the line H shown in Fig. 1, as the dead line of a hoisting mechanism J mounted on the derrick K of a well.

In this form of the invention the body member A is releasably clamped adjacent one end to the line H by the means B which is in the form of a U-bolt 9. The leg 9a of this bolt passes through an opening 10 in the body member and is held in place by means of a nut 11. The other leg 9b of the bolt is engaged in a recess 12 in the body portion as shown in Fig. 4, to restrain the bolt against angular movement about the axis of the leg 9a.

The means C comprises an angularly extended arm 13 on an end of the body member A, and which supports on a pin 14, a grooved roller 15. As shown in Figs. 2 and 3, the pin 14 is removable whereby the roller 15 may be removed and replaced for the purpose hereinafter described. The groove in this roller provides a surface for contacting the side of the line H opposite that in contact with the surfaces formed by the means D, E and F. Thus, the means B and C cooperate to mount the device on the line H with the latter held against the surfaces formed by the means D, E and F.

The means D forming one of the line contacting surfaces is in the form of a grooved roller 16 mounted for free rotation on a pin 17 located at a point on the body member spaced between the roller 15 and the means E. The line contacting surface of the roller 16 and line contacting surface of the roller 15 respectively engage opposite sides of the line H. In this connection it should be noted that the line H is prevented from jumping off the rollers 15 and 16 by means of the arm 13 and an angular strap 19 removably secured at its ends to the pins 14 and 17. When this strap is removed the line H may be readily positioned between the rollers 15 and 16 against the line contacting means D and F, after which the strap is replaced.

The body member A is formed between its ends with a rectangular frame portion 20 having an elongated opening 21 therein. The roller 16 is mounted in this opening adjacent one end of the frame portion 20. This frame portion may be suitably reinforced as by means of the web portion 20a.

The means F, comprises an integral lug or projection 22 formed at one end of the frame portion 20 and provided with a grooved line-contacting surface 22a which is substantially coplanar with the line contacting surface of the roller 16.

The means E providing the movable and outwardly offset line contacting surface is here shown in the form of a grooved roller 24. This roller is supported by resilient means in the form of an arm 25 mounted in the opening 21 and fixed at one end to the frame 20, as here shown in integral formation therewith, so that it serves as a stiff spring. The roller 24 is mounted in the bifurcated free end 26 of the arm 25 on a pin 27, with its line contacting surface spaced outwardly from the line contacting surfaces of the elements 16 and 22, whereby the line is deflected outwardly between the elements 16 and 22.

The gauge G includes a housing 28 secured by fastenings 29 to the frame portion 20 of the body member 1. Mounted within the housing is mechanism 30 operating a pointer 31 movable over a dial 32. The dial may be graduated in pound units or otherwise as desired.

Means are provided for operating the gauge responsive to yielding of the arm 25 according to loads imposed on the line H. Accordingly, an angular arm 33 is secured at one end by means of fastenings 34 to the free end of the arm 25 and at its other end is connected by means of a link 35 to the mechanism 30.

It should be noted that the device readily may be applied to a tensioned line. One way in which this may be accomplished requires the removal of the strap 19 and the U-bolt 9. The device is then positioned so that the line is disposed between the rollers 15 and 16. When thus positioned, the device extends divergently from the line and the outer end thereof may then be swung as a lever toward the line to deflect the line between the rollers 15 and 16 and cause the line to engage the roller 24 and the lug 22. Following this positioning of the device, the strap 19 and the U-bolt 9 are replaced. The U-bolt is then tightened to deflect the line between the U-bolt and the lug 22, thereby completing the installation of the device.

It will now be apparent that when the device is mounted as shown in Figs. 1–7 so as to deflect the line, loads imposed on the line will tend to straighten the deflected portion thereof, thereby causing the roller 24 to move inwardly as the arm 25 yields, whereby through the arm 33 and link 35, the mechanism 30 will operate the gauge G to indicate the tension on the line. The spring action of the arm 25 will return the roller 24 to its normal offset position as the load is removed from the line.

As shown in Fig. 8, another form of this invention is adapted for application to a running line R. This embodiment is of substantially the same construction as that shown in Figs. 1 to 7, except that the body portion M thereof is provided at opposite ends with angularly directed arms 36 and 37 corresponding to the arm 13.

Stationary means 38 and 39, corresponding to the means D and F, are provided in the form of rollers 40 and 41 equidistantly spaced from the movable means 42 which is of the same construction as the means E in the first described form of this invention. The movable means 42 includes a roller 43 supported on a spring arm 44 integral with the body member M in the same manner as in the first described form of this invention. A gauge 45 is identical with the gauge G and operatively connected with the arm 44 in the same manner as gauge G.

As this form of the invention is not clamped on the running line R, it is supported with the rollers 40, 41 and 43 in contact with the same side of the line and so that the line will be deflected outwardly by means of the roller 43. This is accomplished by having rollers 46 and 47 removably mounted on the end portions 36 and 37 and arranged to contact the side of the line opposite that contacting the rollers 40, 41 and 43. Thus, the line extends beneath the rollers 46 and 47, and passes over the rollers 40, 41 and 43.

The installation of this form of the indicator especially on heavily loaded lines of different diameters is facilitated by clamping the line and deflecting it inwardly as shown in Figs. 9 and 10, while the rollers 46 and 47 are removed and the rollers 40, 41 and 43 are in contact with the same side of the line. After thus deflecting the line, the rollers 46 and 47 (see the dotted line showing in Figs. 9 and 10) are mounted in place against the side of the line opposite that in contact with rollers 40, 41 and 43. When the rollers 46 and 47 are remounted, the clamping means is released as shown in Fig. 8. As here shown, the means for clamping and deflecting the line includes a pair of J-bolts 48 and 49 mounted in apertured ears 49a on the body portion M and adapted to be clamped and released by means of nuts 49b. As shown in Fig. 8 these J-bolts have been released from line clamping position and are disposed in an inoperative position in which no pressure is exerted thereby upon the line. If desired, the J-bolts may be removed after the device is installed on the line.

If desired, this form of the present invention may be applied to a tensioned line in a manner similar to that described in connection with the device shown in Figs. 1–7. This may be accomplished by removing the J-bolts 48 and 49 and the roller 47, then positioning the device so that the line is disposed between the rollers 46 and 40. The outer or free end of the device is then swung as a lever toward the line so as to deflect the line between the rollers 46 and 40 and engage the line with the rollers 43 and 41. The J-bolts 48 and 49 are then replaced and J-bolt 49 is tightened to deflect the line beyond the roller 41, after which the roller 47 is replaced so as to contact the line.

When this indicator has been installed on the line and secured against longitudinal movement relative to the line, with the latter deflected between rollers 40 and 46 also between rollers 41 and 47, as shown in Fig. 8, it is ready for operation to indicate the tension or loads on the line while the line is running or stationary.

Any suitable means may be employed for restraining the device against longitudinal movement with relation to the line R. As here shown, this means may comprise a pair of flexible elements 50 secured at their lower end to lugs 51 on the ends 36 and 37 and at their upper ends to a pair of posts 52.

This device operates in the same manner as the device shown in Figs. 1 through 7 to indicate the tension on the running line R.

While this form of the invention is especially designed for use in connection with a running line, it is also adapted to be employed with a stationary line, as any suitable means, such as that shown in Fig. 8, may be employed to hold the device in place on a stationary line.

It is important to note that in both forms of the invention similar means form stationary surfaces for contacting the cable or line at points axially spaced on the same side of the line, and that similar movable means form surfaces for contacting the same side of the line as the stationary surfaces and deflecting the line outwardly at a point between the latter. This arrangement makes it possible to use the device without replacement or interchange parts thereof, for accurately determining the tension on cables of different diameters.

It is important to note that in both forms of the invention, the tension sensing means is on the same side of the line as engaged with the three line-contacting members that are inwardly spaced from the line-deflecting members which engage the other side of the line at the ends of the device. This arrangement makes it possible readily to install the devices on the line without reeving the line between rollers and is most advantageous where the line is under tension at the time of installing the devices.

Another way in which the device shown in Figs. 1–7 may be mounted for operation on the line without reeving the line in place, requires that the U-bolt 9, the roller 15 and the strap 19 be removed. The device is then moved against the line so that one side of the line will engage the rollers 16 and 24 and the member 22. After this, the roller 15 and the U-bolt are replaced so as to engage the other side of the line and deflect the line at points outwardly spaced from the roller 16 and member 22 respectively.

I claim:

1. A tension indicator for a load-sustaining line, comprising an elongated body member having an opening extending longitudinally thereof, means forming a plurality of surfaces at spaced points along said body member for contacting the same side of said line, means supporting one of said surface forming means in outwardly offset relation to and between the other of said surface forming means including an arm integral at one end with said body member within said opening and connected at its other end with said means forming said one surface, for resiliently resisting movement thereof; a gauge carried by said body member, means operating responsive to movement of said arm for operating said gauge, and means on said body member longitudinally spaced from said surface forming means for holding said line in contact with said surfaces.

2. A tension indicator for a load sustaining line comprising an elongated body member adapted to be positioned alongside said line, a plurality of rollers supported at axially spaced points along said body member, those of the rollers next adjacent the ends of the body member being outwardly offset from the other rollers, for engaging the side of the line remote from said body member, the other of said rollers being disposed to contact the side of the line opposed to the body member, means yieldably supporting one of said other rollers in position to deflect the line, an indicator, and means for operating the indicator connected with said yieldable means, and clamping members on said body member between said other rollers and the rollers which are next adjacent the ends of the body member movable between a position for deflecting the line toward the body member for positioning the line for contact with said rollers next adjacent the ends of the body member and a position free of deflecting contact with said line, all of said rollers being disposed to engage said line when said clamping members are out of deflecting contact with said line.

3. A device for indicating the load on a load-sustaining line, comprising, an elongated body member, means at longitudinally spaced points on said body member forming surfaces for contacting the same side of said line; means on said body member between said surfaces, forming a surface in outwardly offset relation to said first named surfaces and movable with respect thereto while in contact with said side of said line, and means responding to movement of said movable surface for indicating the load on said line, line contacting members adjacent the ends of said body member for contacting the side of the line opposite that in contact with said surfaces, and clamping means on said body member movable between a position contacting and deflecting the line toward said body member adjacent said line contacting members and a position in which the clamping means is free from said deflecting-contact with said line, all of said surfaces and said line-contacting members being disposed to engage and maintain the line deflected following movement of said clamping means to said position free from deflecting contact with said line.

4. A device for indicating the tension on a load-supporting line comprising: an elongated body; three members longitudinally spaced along said body for contacting one side of a load-sustaining line; means movable on said body supporting the intermediate of said three members in laterally spaced relation to the other two members; line deflecting members operable on said body member beyond and in outwardly spaced relation to said other two members for engaging the other side of said line and deflecting the line toward said body; one of said line-deflecting members and one of said first mentioned three members being spaced to receive the line therebetween and to engage said one side of said line with said three members upon movement of said body laterally of said line; and means on said body operatively connected with said movable supporting means and disposed on said one side of said line for actuating an indicating means.

5. A device for indicating the tension on a load-supporting line comprising: an elongated body; three members longitudinally spaced along said body for contacting one side of a load-sustaining line; means movable on said body supporting the intermediate of said three members in outwardly offset relation to the other two members; means removably mounted on said body located in longitudinally spaced relation to and beyond one of said two members for clamping the line to said body; line-deflecting means mounted on said body in longitudinally and outwardly spaced relation to the other of said two members such that upon moving the device laterally of the line, the line may be positioned between said line-deflecting means and said three line engaging members; and means on said body disposed on the same side of the line as engaged by said three members operable responsive to said movable supporting means for actuating an indicator.

6. A device for indicating the tension on a running line comprising: a body; three rollers mounted in longitudinally spaced relation on said body for contacting one side only of a running line; means on said body opposite said one side of said line yieldably supporting the intermediate of said rollers in outwardly offset relation to the other two rollers; line-deflecting rollers removably mounted on said body in longitudinally and outwardly spaced relation to said other two rollers for contacting the other side of said line; and means on the body on said one side of said line operable responsive to said yieldable supporting means for actuating an indicator; the spacing of said deflecting rollers from said two rollers permitting movement of the device toward the line to dispose the line between said deflecting rollers and said three rollers.

7. A tension indicator for a load-sustaining line comprising: an elongated body adapted to be positioned along the line; three members mounted between the ends of said body in longitudinally spaced relation to one another for engaging one side of said line; an arm on said body yieldably supporting the intermediate of said line engaging members in laterally offset relation to the other two line-engaging members; means on said body operatively connected with said arm for actuating an indicator responsive to yielding of said arm; said arm and last-named means being on the same side of said line as said three line engaging members; and line deflecting members mounted on said body adjacent the side of said body; each line deflecting member being longitudinally spaced from an adjacent line-engaging member for engaging the other side of said line; one of said line-deflecting members being laterally spaced from the adjacent line-engaging member to provide therebetween a space in which said line may be positioned for engaging said three members and both deflecting members upon moving the device laterally of the line.

8. A device for indicating the tension on a line adapted to sustain a load comprising: a body member; means thereon providing a plurality of surfaces in a row for contacting longitudinally spaced points on the same side of the line; movable means on said body member disposing one of said surfaces between the ends of said row in outwardly offset relation to the other surfaces; line-contacting members removably mounted on said body member at points laterally spaced from and beyond the end surfaces of said row for contacting the side of the line opposite that contacting said surfaces to hold the line against said surfaces; clamping means on said body member between said end surfaces and said line contacting members movable between a position for contacting and deflecting the line inwardly toward said body member and an inoperative position free from deflecting contact with the line; and means connected with said movable means operable responsive thereto for actuating an indicator; said last named means being disposed on that side of the line contacted by said plurality of surfaces.

9. A device for indicating the tension on a running line adapted to sustain a load, comprising: an elongated body; means between the ends of said body forming a row of longitudinally spaced surfaces for contacting one side of the line; movable means on said body disposing one of said surfaces between the ends of said row in outwardly offset relation to the other surfaces; means operatively connected with said movable means for actuating indicating means; said body having angularly extended arms at its ends; members on said arms disposed in laterally offset relation to and beyond the end surfaces in said row for engaging the other side of the line; said movable means and said actuating means being disposed on the same side of said line as engaged by said row of surfaces; said surfaces and said members on said arms being disposed to permit lateral movement of the device relative to the line to position the line between and in contact with said surfaces and said members.

10. A device for indicating the tension on a load sustaining line comprising: an elongated body; a pair of members longitudinally spaced on said body for engaging one side of a load-sustaining line; a member mounted on said body for movement relative thereto having a line contacting surface disposed in laterally offset relation to and between the members of said pair for contacting said one side of said line; means on said body operatively connected with said movable member and disposed on said one side of said line for operating an indicator responsive to movement of said movable member; and line deflecting members removably mounted on said body in longitudinally spaced relation to and beyond the members of said pair for engaging the other side of said line; removal of said line deflecting members permitting said members of said pair and said movable member to be engaged with said one side of said line upon movement of said device laterally of said line.

References Cited in the file of this patent

UNITED STATES PATENTS

| | | |
|---|---|---|
| 2,092,303 | Conrad | Sept. 7, 1937 |
| 2,118,727 | Hanes | May 24, 1938 |
| 2,452,302 | Hitchen | Oct. 26, 1948 |

FOREIGN PATENTS

| | | |
|---|---|---|
| 130,658 | Great Britain | Aug. 14, 1919 |